United States Patent [19]

Tew

[11] Patent Number: 5,182,446
[45] Date of Patent: Jan. 26, 1993

[54] CIRCUIT WITH RESET NOISE CANCELLATION

[75] Inventor: Claude E. Tew, Dallas, Tex.

[73] Assignee: Texas Instruments Incorporated, Dallas, Tex.

[21] Appl. No.: 770,684

[22] Filed: Oct. 3, 1991

[51] Int. Cl.⁵ .............................................. H01J 40/14
[52] U.S. Cl. ............................. 250/208.1; 358/213.15
[58] Field of Search ................ 250/208.1; 358/213.15, 358/213.16; 307/311, 308, 360

[56] References Cited

U.S. PATENT DOCUMENTS 4,659,928  4/1987  Tew ..................................... 250/330
4,980,546  12/1990  Berger ............................. 250/208.1

Primary Examiner—David C. Nelms
Assistant Examiner—Teresa Davenport

[57] ABSTRACT

A circuit primarily for use in conjunction with focal plane arrays which rejects input reset noise without adding power and complexity to the circuit. The circuit includes a preamplifier having input and output terminals, a first capacitor coupled between the input terminal and a source of reference potential, a second capacitor coupled between the output terminal and the source of reference potential, a switch coupled between the output terminal and the second capacitor coupling the output terminal to the second capacitor in response to a first predetermined signal, a third capacitor coupled between the junction of the switch and the second capacitor and a circuit output terminal and a plurality of fourth capacitors, each of the fourth capacitors coupled to a photodetector and having a switch responsive to a second predetermined signal controlling coupling of the fourth capacitor in parallel with the first capacitor. The values of the first, second, third and fourth capacitors are substantially in accordance with the relation $C_P/(C_p+C_{DN}) = C_X/(C_X+C_c)$, where $C_P$ is the first capacitor, $C_X$ is the second capacitor, $C_C$ is the third capacitor and $C_{DN}$ is the fourth capacitor.

14 Claims, 1 Drawing Sheet

CIRCUIT WITH RESET NOISE CANCELLATION

BACKGROUND OF THE INVENTION

1. Field of the Invention

This invention relates to a circuit for cancellation of reset noise and, more specifically, to such a circuit, generally in conjunction with a focal plane array (FPA).

2. Background and Brief Description of the Prior Art

Staring focal plane arrays are composed of many detectors which detect a particular portion of a scene and which must be read out in some ordered manner. This read out generally is accomplished by multiplexing the outputs of several detectors into a single preamplifier. In order to obtain accurate reading of the detector outputs at the preamplifier input, it is necessary that, between the serial readings of the detector outputs, the preamplifier input be cleansed of the total signal from the prior sample video, this generally being accomplished by resetting the preamplifier input to a predetermined DC voltage. The reset operation gives rise to a noise term at the preamplifier input generally known as KTC noise which is $V_n = (KT/C_p)^{\frac{1}{2}}$, where $V_n$ is the noise voltage, K is Boltzmann's constant, T is the temperature in degrees Kelvin and $C_p$ is the input capacitance of the preamplifier in farads and is the sum of all capacitances on the input node, preamplifier capacitance, read line capacitance and stray capacitance. This noise term can be substantial compared to the signals produced by the detectors of the array and thereby introduce significant error in the output. Accordingly, this noise must be cancelled out to fully realize the performance potential of the focal plane array.

The above described reset noise remains correlated from the reset time to the read time for the next detector and can be removed by a correlated double sampling. However, the magnitude of the noise term changes when the detector is addressed. This is better understood with reference to FIGS. 1 and 2. When the preamplifier input is reset as shown in FIG. 2 for timing signal $\phi_R$, switch $S_R$ closes, switches $S_1$ through $S_N$, which represent the detector addresses, being open at this time. This closing and opening of switch $S_R$ provides the undesirable KTC noise. The detectors are schematically represented in all figures herein as capacitors $C_{D1}$ to $C_{DN}$ charged to voltages representing the video information detected by the associated detector. The noise created by the reset is stored on the clamp capacitor $C_c$ before the detectors are addressed. The switch $S_c$ is then closed as shown in FIG. 2 for timing signal $\phi_c$ to discharge capacitor $C_c$ and store the KTC noise value thereon. The switch $S_N$ is then closed as shown in FIG. 2 for timing signal $\phi_{DN}$ to transfer the charge on capacitor $C_{DN}$ to capacitor $C_p$. The signal voltage is amplified by the preamplifier and is coupled through the capacitor $C_c$. The signal is transferred to capacitor $C_s$ at time $\phi_s$. (The gain of the preamplifier is assumed to be unity for ease of explanation. Also DC terms are not carried through for the same reason.)

When switch $S_N$ closed, a charge representing the video from the detector and stored on the capacitor $C_{DN}$ is stored onto capacitor $C_p$ along with the noise term thereat. The result with regard to the noise is that the noise on the capacitor at the preamplifier input drops to:

$$V_n' = [C_p/(C_p + C_{DN})](KT/C_p)^{\frac{1}{2}}$$

The noise that appears on the sample (i.e., the capacitor $C_s$ when $O_s$ is closed) is:

$$V_n^o = V_n' - V_n = (KT/C_p)^{\frac{1}{2}}[C_p/(C_p + C_{DN}) - 1]$$

It is readily apparent that except where $C_p$ is much greater than $C_D$, the cancellation scheme is not effective.

The same problem has been solved in barium strontium titanate (BST) focal plane arrays by using paralleled amplifiers to drive the correlated double sampler (CDS) clamp capacitor $C_c$. The gains were scaled such that the difference in gains matched the capacitive divider and rejection was achieved. Another prior art scheme changes the gain of the preamplifier from clamp to sample time in order to track the capacitive divider at the input.

Some problems with these solutions are:

1. For parallel amplifiers, additional power dissipation is required whereas space for the additional circuitry is at a premium for IR focal plane arrays (FPAs). Also, 1/F noise from the parallel amplifiers does not tend to cancel and, in fact, may be additive.

2. Sequential gain changing is time consuming and provides a technical challenge to maintain tracking from channel to channel. The more complex circuits consume additional power. DC shifts in the preamplifier output also corrupt the signal from clamp to sample time.

SUMMARY OF THE INVENTION

In accordance with the present invention, the above described deficiencies of the prior art are minimized and there is provided a circuit which rejects noise, particularly, but not limited to staring IR focal plane array without adding power and complexity to the silicon IC processor. This noise improvement reduces processor noise by nearly the square root of two for most designs and makes the focal plane arrays less susceptible to picking up extraneous system noise, thereby providing high performance more simply than in the prior art. In addition, the yields provided in processing should increase substantially. This invention may also be used on other focal plane arrays and systems, such as, for example, pyroelectric focal plane arrays, arrays of particle detectors, analog memory readouts and solid state imaging arrays with photocapacitor and photodiode architectures for visible application.

More specifically, an additional switch $S_x$ is added in series with the output of the preamplifier and a capacitor $C_x$ to ground is added at the output of the preamplifier after the added switch in accordance with the present invention. The result of the circuit addition is shown as follows:

As before the terms for noise are:

$$V_n = (KT/C_p)^{\frac{1}{2}}, \text{ and}$$

$$V_n' = C_p/(C_p + C_{DN}) [KT/C_p]^{\frac{1}{2}}$$

However, the noise stored on the clamp capacitor $C_c$ is:

$$V_o = C_x/(C_x + C_c) [KT/C_p]^{\frac{1}{2}}$$

Note that the activator of the signal closing the switch $S_x$ during the on time of the reset signal resets old $KT/C_p$ noise from the clamp capacitor and the voltage stored on the samples is:

$$V_n = \{[(C_p/(C_p+C_{DN})] - [C_x/(C_x+C_c)]\}(KT/C_p)^{\frac{1}{2}}$$

It is now readily apparent that $C_x$ and $C_c$ can be chosen such that:

$$C_p/(C_p+C_{DN}) = C_x/(C_x+C_c)$$

whereby $V_n$ would then be zero, thereby eliminating all noise, assuming a perfect match.

The above described technique is superior to the prior art systems because:

1. it cancels out KTC or $(KT/C_p)^{\frac{1}{2}}$ noise.
2. it cancels out any aliased terms of system noise sampled by the reset operation of the preamplifier input.
3. it still provides rejection of preamplifier 1/F noise.
4. it adds virtually no power to the architecture.

An alternate embodiment would not require the output sample circuits $S_s$ and $C_s$.

The preamplifier will generally have sufficient gain to raise the video signals above the system noise floor.

DESCRIPTION OF THE PREFERRED EMBODIMENTS

Figure 1:
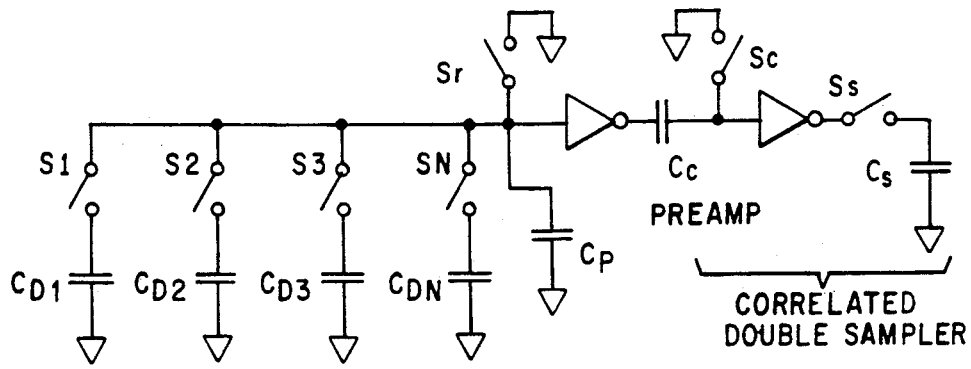
FIG. 1 is a circuit diagram of a prior art staring IR focal plane array.
Figure 3:
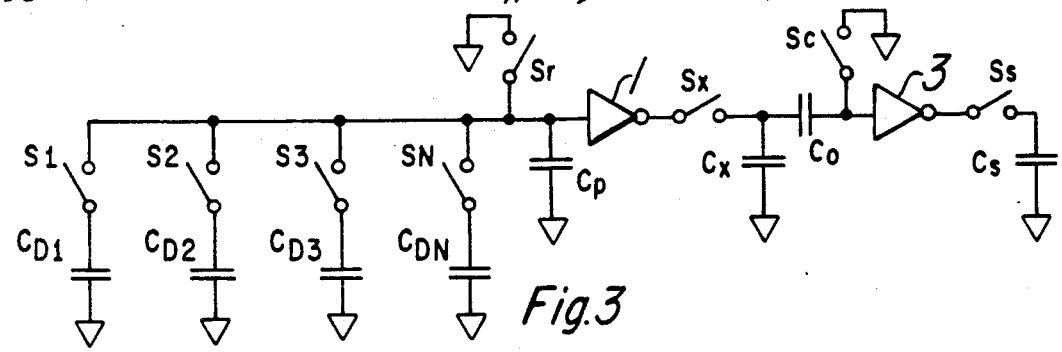
FIG. 3 is a circuit diagram of a circuit in accordance with a first embodiment of the present invention.
Figure 4:
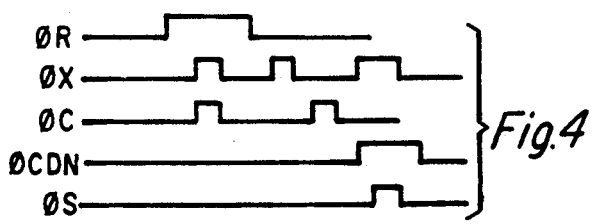
FIG. 4 is a timing diagram for use in conjunction with the circuit of FIG. 3.

Referring now to FIGS. 3 and 4, there is shown a circuit and timing diagram therefor in accordance with a first embodiment of the present invention. The circuit is identical to that of FIG. 1 except for the addition of switch $S_X$ and capacitor $C_X$. The circuit includes a plurality of capacitors $C_{D1}$ to $C_{DN}$ which represent the video information thereon received from detectors. The output of each of the capacitors $C_{D1}$ to $C_{DN}$ is controlled by an associated switch $S_1$ to $S_N$ respectively and is fed to capacitor $C_p$ at the input of preamplifier 1. The capacitor $C_p$ is discharged to ground by closure of switch $S_R$. The output of the preamplifier 1 is fed through switch $S_X$ to a capacitor $C_X$ which is coupled between the preamplifier output and after switch $S_X$ and ground or reference voltage. A series clamp capacitor $C_C$ is coupled between the switch $S_x$ and an amplifier 3 with a switch $S_C$ coupled between the input of amplifier 3 and ground. The output of amplifier 3 passes through a switch $S_s$ to a capacitor $C_s$ which is the circuit output. In order to eliminate the KTC noise, the value of the capacitor $C_X$ is set to be equal to $(C_cC_p)/C_D$ where $C_D$ is the capacitance of a capacitor which represents the video information received from an associated detector, these capacitors being shown in FIG. 3 as $C_{D1}...C_{DN}$.

In operation, when the preamplifier input is reset at as shown in FIG. 4 for timing signal $\phi_R$, switch $S_R$ closes and switches $S_1$ through $S_N$, which represent the detector addresses, are open. The closing and opening of switch $S_R$ both provide the undesirable KTC noise, the closing also discharging or resetting capacitor $C_p$. The detectors, which are schematically represented as capacitors $C_{D1}$ to $C_{DN}$, are at this time charged to voltages representing the video information detected by the associated detector. The noise created by the reset switch closing and opening is stored on capacitor $C_p$. The switches $S_X$ and $S_c$ are first closed during reset to discharge capacitor $C_c$ and close the path from capacitor $C_p$ through preamplifier 1 to capacitor $C_X$ to charge that capacitor with the noise signal on capacitor $C_p$. After the termination of reset, the switch $S_X$ is again momentarily closed to direct any further noise to capacitors $C_X$ and $C_c$ with the switch $S_c$ then being closed to again discharge any noise signal from the capacitors $C_X$ and $C_c$. One of the switches $S_N$ is then closed as shown in FIG. 4 for timing signal $\phi_{CDN}$ to transfer the charge on the associated capacitor $C_{DN}$ to capacitor $C_p$ and through the preamplifier to capacitors $C_X$ and $C_c$ where it is stored and transferred to capacitor $C_s$ with the simultaneous closing of switch $S_s$. (The gain of the preamplifier is assumed to be unity for ease of explanation. Also DC terms are not carried through for the same reason.) In accordance with the present invention, the KTC noise has been essentially removed by setting the values of capacitors $C_x$ and $C_c$ such that $C_p/(C_p+C_{DN}) = C_X/(C_X+C_c)$.

Figure 2:
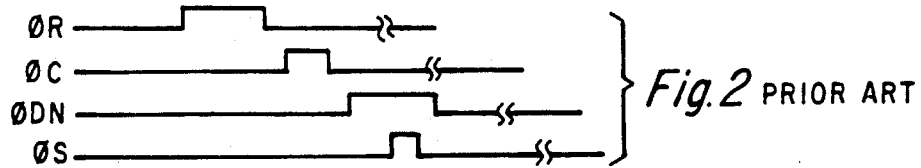
FIG. 2 is a timing diagram for use in conjunction with the circuit of FIG. 1.
Figure 6:
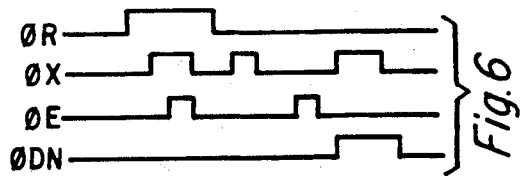
FIG. 6 is a timing diagram for use in conjunction with the circuit of FIG. 5.
Figure 5:
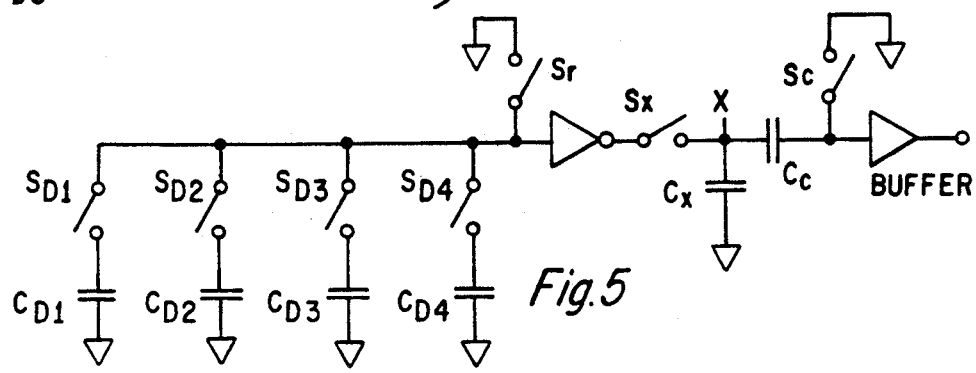
FIG. 5 is a circuit diagram of a circuit in accordance with a second embodiment of the present invention.

As a second embodiment of the invention, the embodiment of FIGS. 5 and 6 is provided except that the sample circuit composed of switch $S_s$ and capacitor $C_s$ has been omitted. For this embodiment, the sample operation takes place when the 0dn switch is closed by closing the 0sx switch. The signal is held by the capacitance at node X, being the sum of Cx and the series combination of Cc and the input capacitance of the buffer amplifier. The sum is denominated by Cx. This embodiment is advantageous because it requires fewer parts and can fit into a more compact circuit layout while providing the same performance advantages as the embodiment of FIG. 2.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A low noise reset circuit which comprises:
   (a) a preamplifier having input and output terminals;
   (b) a first capacitor coupled between said input terminal and a source of reference potential;
   (c) a second capacitor coupled between said output terminal and said source of reference potential;
   (d) a switch coupled between said output terminal and said second capacitor coupling said output terminal to said second capacitor in response to a first predetermined signal; and
   (e) a third capacitor coupled between the junction of said switch and said second capacitor and a circuit output terminal.

2. The circuit as set forth in claim 1 further including a fourth capacitor and a switch controlling said fourth capacitor responsive to a second predetermined signal in parallel with said first capacitor.

3. The circuit as set forth in claim 2 wherein said fourth capacitor is coupled to a photodetector.

4. The circuit as set forth in claim 2 wherein the values of said first, second, third and fourth capacitors are substantially in accordance with the relation $C_p/(C_p+C_{DN})=C_X/(C_X+C_c)$, where $C_p$ is said first capacitor, $C_X$ is said second capacitor, $C_c$ is said third capacitor and $C_{DN}$ is said fourth capacitor.

5. The circuit as set forth in claim 3 wherein the values of said first, second and third capacitors are substantially in accordance with the relation $C_p/(C_p+C_{DN})=C_X/(C_X+C_c)$, where $C_p$ is said first capacitor, $C_X$ is said second capacitor, $C_c$ is said third capacitor and $C_{DN}$ is said fourth capacitor.

6. The circuit as set forth in claim 1 further including a switch coupled to said third capacitor and responsive to a predetermined signal to discharge said third capacitor.

7. The circuit as set forth in claim 2 further including a switch coupled to said third capacitor and responsive to a predetermined signal to discharge said third capacitor.

8. The circuit as set forth in claim 3 further including a switch coupled to said third capacitor and responsive to a predetermined signal to discharge said third capacitor.

9. The circuit as set forth in claim 4 further including a switch coupled to said third capacitor and responsive to a predetermined signal to discharge said third capacitor.

10. The circuit as set forth in claim 5 further including a switch coupled to said third capacitor and responsive to a predetermined signal to discharge said third capacitor.

11. A focal plane array circuit which comprises:
(a) a plurality of photodetectors;
(b) a preamplifier having input and output terminals;
(c) a first capacitor coupled between said input terminal and a source of reference potential;
(d) a second capacitor coupled between said output terminal and said source of reference potential;
(e) a switch coupled between said output terminal and said second capacitor coupling said output terminal to said second capacitor in response to a first predetermined signal;
(f) a third capacitor coupled between the junction of said switch and said second capacitor and a circuit output terminal; and
(g) a plurality of fourth capacitors, each of said fourth capacitors coupled to a said photodetector and having a switch responsive to a second predetermined signal controlling coupling of said fourth capacitor in parallel with said first capacitor.

12. The circuit as set forth in claim 11 wherein the values of said first, second, third and fourth capacitors are substantially in accordance with the relation $C_p/(C_p+C_{DN})=C_x/(C_x+C_c)$, where $C_p$ is said first capacitor, $C_x$ is said second capacitor, $C_c$ is said third capacitor and $C_{DN}$ is said fourth capacitor.

13. The circuit as set forth in claim 11 further including a switch coupled to said third capacitor and responsive to a predetermined signal to discharge said third capacitor.

14. The circuit as set forth in claim 12 further including a switch coupled to said third capacitor and responsive to a predetermined signal to discharge said third capacitor.

* * * * *